| (12) | United States Patent<br>Gopalakrishnan et al. | (10) Patent No.: US 8,965,005 B1<br>(45) Date of Patent: Feb. 24, 2015 |
|---|---|---|

(54) TRANSMISSION OF NOISE COMPENSATION INFORMATION BETWEEN DEVICES

(75) Inventors: Varada Gopalakrishnan, Cupertino, CA (US); Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 408 days.

(21) Appl. No.: 13/494,835

(22) Filed: Jun. 12, 2012

(51) Int. Cl.
*H04B 15/00* (2006.01)

(52) U.S. Cl.
USPC .......................................... 381/94.1

(58) Field of Classification Search
CPC ............... H04R 3/005; H04R 2410/07; G10L 21/0208; G10L 2021/02165; G11B 20/24
USPC ................................. 381/94.1–94.7
See application file for complete search history.

(56) References Cited

U.S. PATENT DOCUMENTS

| 7,412,382 | B2 | 8/2008 | Noda et al. | |
| 8,254,617 | B2 | 8/2012 | Burnett | |
| 8,358,631 | B2 * | 1/2013 | Hafeez | 370/332 |
| 8,737,501 | B2 * | 5/2014 | Shah et al. | 375/267 |
| 8,811,348 | B2 * | 8/2014 | Rangan et al. | 370/332 |
| 2006/0147063 | A1 | 7/2006 | Chen | |
| 2008/0260175 | A1 | 10/2008 | Elko | |

OTHER PUBLICATIONS

Appolicious Inc., "Developer's Notes for: AutoVolume Lite~~Best music app to detect noise and decrease or increase volume loudness automatically," Apr. 23, 2012, 4 pages, <http://www.appolicious.com/music/apps/1002027-autovolume-lite-best-music-app-to-detect-noise-and-decrease-or-increase-volume-loudness-automatically-jaroszlav-zseleznov/developer_notes>.

\* cited by examiner

*Primary Examiner* — Simon Sing
(74) *Attorney, Agent, or Firm* — Lowenstein Sandler LLP

(57) ABSTRACT

One or more microphones of a first devices receive a first audio. The first device generates a first audio signal from the received first audio. The first device analyzes the first audio signal to determine noise characteristics included in the first audio received by the first device. The first device generates noise compensation information based at least in part on the noise associated with the first audio. The first device transmits the noise compensation information to at least one of a second device or a third device that is intermediate to the first device and the second device. The first device receives a second audio signal generated by the second device, wherein the second audio signal is based at least in part on the noise compensation information transmitted by the first device. The first device then outputs the second audio signal to a speaker of the first device.

25 Claims, 13 Drawing Sheets

TRANSMISSION OF NOISE COMPENSATION INFORMATION BETWEEN DEVICES

BACKGROUND OF THE INVENTION

Individuals frequently use mobile phones in noisy environments. This can make it difficult for an individual in a noisy environment to hear what a person at a far end of a connection is saying, and can make it difficult for the person at the far end of the connection to understand what the individual is saying.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for enabling a user device to dynamically adjust characteristics of a received audio signal are described. Methods and systems for enabling a user device or server to transmit and receive noise compensation information, and to adjust audio signals based on such noise compensation information, are also described. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, a user device generates a first audio signal from first audio captured by one or more microphones. The user device performs an analysis of the first audio signal to determine noise associated with the first audio (e.g., to determine audio characteristics of a noisy environment). The user device receives a second audio signal (e.g., from a server or remote user device), and processes the second audio signal based at least in part on the determined noise. For example, the user device may compensate for a detected noisy environment based on the determined audio characteristics of the noisy environment.

In another embodiment, a destination device generates a first audio signal from audio captured by one or more microphones. The destination device performs an analysis of the first audio signal to determine noise associated with the first audio (e.g., to determine audio characteristics of a noisy environment of the user device), and generates noise compensation information based at least in part on the noise associated with the first audio. For example, the noise compensation information may include the audio characteristics of the noisy environment. The destination device transmits the noise compensation information to a source device. The source device generates a second audio signal based at least in part on the noise compensation information transmitted by the first device (e.g., adjusts a second audio signal based on the noise compensation information), and sends the second audio signal to the destination device. The destination device can then play the second audio signal (e.g., output the second audio signal to speakers). Since the source device generated and/or adjusted the second audio signal to compensate for the noisy environment, a user of the destination device will be better able to hear the second audio signal over the noisy environment. This can improve an ability of the user to converse with a user of the source device (e.g., in the instance in which the audio data is voice data and the source and destination devices are mobile phones). Additionally, this can improve an ability of the user of the destination device to hear streamed audio (e.g., from a music server).

Figure 1:
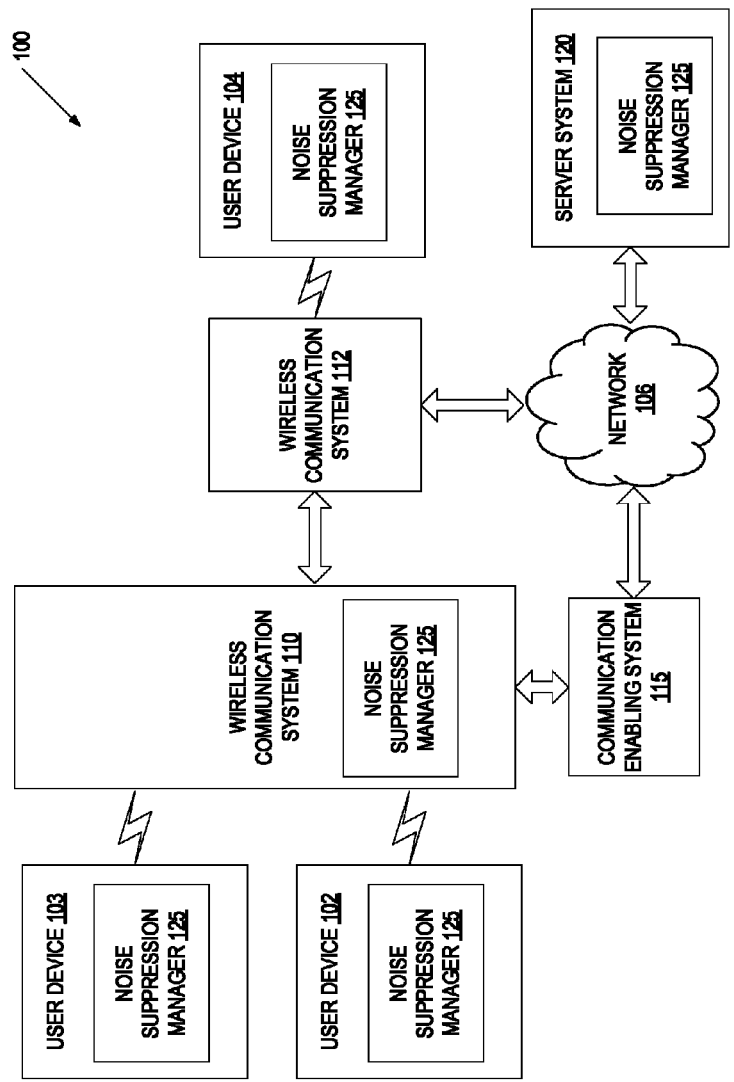
FIG. 1 is a block diagram of an exemplary network architecture, in accordance with one embodiment of the present invention.

FIG. 1 is a block diagram of an exemplary network architecture 100 in which embodiments described herein may operate. The network architecture 100 may include a server system 120 and one or more user devices 102-104 capable of communicating with the server system 120 and/or other user devices 102-104 via a network 106 (e.g., a public network such as the Internet or a private network such as a local area network (LAN)) and/or one or more wireless communication systems 110, 112.

The user devices 102-104 may be variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 102-104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like. In one embodiment, the user devices 102-104 are mobile devices.

The user devices 102-104 may establish a voice connection with each other, and may exchange speech encoded audio data. Additionally, server system 120 may deliver audio signals to the user devices 102-104, such as during streaming of music or videos to the user devices 102-104.

User devices 102-104 may connect to other user devices 102-104 and/or to the server system 120 via one or more wireless communication systems 110, 112. The wireless communication systems 110, 112 may provide a wireless infrastructure that allows users to use the user devices 102-104 to establish voice connections (e.g., telephone calls) with other user devices 102-104, to purchase items and consume items provided by the server system 120, etc. without being tethered via hardwired links. One or both of the wireless communications systems 110, 112 may be wireless fidelity (WiFi) hotspots connected with the network 106. One or both of the wireless communication systems 110, 112 may alternatively be a wireless carrier system (e.g., as provided by Verizon®, AT&T®, T-Mobile®, etc.) that can be implemented using various data processing equipment, communication towers, etc. Alternatively, or in addition, the wireless communication systems 110, 112 may rely on satellite technology to exchange information with the user devices 102-104.

In one embodiment, wireless communication system 110 and wireless communication system 112 communicate directly, without routing traffic through network 106 (e.g., wherein both wireless communication systems are wireless carrier networks). This may enable user devices 102-104 connected to different wireless communication systems 110, 112 to communicate. One or more user devices 102-104 may use voice over internet protocol (VOIP) services to establish voice connections. In such an instance, traffic may be routed through network 106.

In one embodiment, wireless communication system 110 is connected to a communication-enabling system 115 that serves as an intermediary in passing information between the server system 120 and the wireless communication system 110. The communication-enabling system 115 may communicate with the wireless communication system 110 (e.g., a wireless carrier) via a dedicated channel, and may communicate with the server system 120 via a non-dedicated communication mechanism, e.g., a public Wide Area Network (WAN) such as the Internet.

The server system 120 may include one or more machines (e.g., one or more server computer systems, routers, gateways, etc.) that have processing and storage capabilities to serve media items (e.g., movies, video, music, etc.) to user devices 102-104. In one embodiment, the server system 120 includes one or more cloud based servers, which may be hosted, for example, by cloud based hosting services such as Amazon's® Elastic Compute Cloud® (EC2). Server system 120 may additionally act as an intermediary between user devices 102-104. When acting as an intermediary, server system 120 may receive audio signals from a source user device, process the audio signals (e.g., adjust them to compensate for background noise), and then transmit the adjusted audio signals to a destination user device. In an example, user device 102 may make packet calls that are directed to the server system 120, and the server system 120 may then generate packets and send them to a user device 103, 103 that has an active connection to user device 102. Alternatively, wireless communication system 110 may make packet calls to the server system 120 on behalf of user device 102 to cause server system 120 to act as an intermediary.

In one embodiment, one or more of the user devices 102-104 and/or the server system 120 include a noise suppression manager 125. The noise suppression manager 125 in a user device 102-104 may analyze audio signals generated by one or more microphones in that user device 102-104 to determine characteristics of background noise (e.g., of a noisy environment).

One technique for determining noise characteristics for background noise is a technique called multi-point pairing, which uses two microphones to identify background noise. The two microphones are spatially separated, and produce slightly different audio based on the same input. These differences may be exploited to identify, characterize and/or filter out or compensate for background noise.

In one embodiment, audio signals based on audio captured by the two microphones are used to characterize an audio spectra, which may include spatial information and/or pitch information. A first audio signal from the first microphone may be compared with a second audio signal from the second microphone to determine the spatial information and the pitch information. For example, differences in loudness and in time of arrival at the two microphones can help to identify where sounds are coming from. Additionally, differences in sound pitches may be used to separate the audio signals into different sound sources.

Once the audio spectra is determined, frequency components may be grouped according to sound sources that created those frequency components. In one embodiment, frequency components associated with a user are assigned to a user group and all other frequency components are assigned to a background noise group. These frequency components in the background group may represent noise characteristics of an audio signal.

In one embodiment, noise suppression is performed by one or more multi-microphone noise reduction algorithms that run on a hardware module such as a chipset (commonly referred to as a voice processor). Background noise may be determined by comparing an input of the voice processor to an output of the voice processor. If the output is close to the input, then it may be determined that little to no noise suppression was performed by the voice processor on an audio signal, and that there is therefore little background noise. If the output is dissimilar to the input, then it may be determined that there is a detectable amount of background noise. In one embodiment, the output of the voice processor is subtracted from the input of the voice processor. A result of the subtraction may identify those frequencies that were removed from the audio signal by the voice processor. Noise characteristics (e.g., a spectral shape) of the audio signal that results from the subtraction may identify both frequencies included in the background noise and a gain for each of those frequencies.

Based on this analysis, the noise suppression manager 125 may adjust an audio signal that is received from a remote user device 102-104 or from the server system 120 to compensate for the background noise. For example, noise suppression manager 125 may increase a gain for an incoming audio signal on specific frequencies that correspond to those frequencies that are identified in the noise characteristics.

The noise suppression manager 125 may additionally or alternatively generate noise compensation information that includes the characteristics of the background noise. The noise suppression manager 125 may then transmit a signaling message containing the noise compensation information to a remote user device 102-104 and/or to the server system 120. A noise suppression manager 125 in the remote user device 102-104 or server system 120 may then adjust an audio signal based on the noise compensation information before sending the audio signal to the user device 102-104 that sent the signaling message.

The server system 120 may have greater resources than the user devices 102-104. Accordingly, the server system 120 may implement resource intensive algorithms for spectrally shaping and/or otherwise adjusting the audio signals that are beyond the capabilities of the user devices 102-104. Thus, in some instances improved noise suppression and/or compensation may be achieved by having the server system 120 perform the noise suppression for the user devices 102-104. Note that in alternative embodiments, the capabilities of the server system 120 may be provided by one or more wireless communication systems 110, 112. For example, wireless communication system 110 may include a noise suppression manager 125 to enable wireless communication system 110 to perform noise suppression services for user devices 102-104.

In the use case of voice connections (e.g., phone calls), a user device 102-104 typically obtains an audio signal from a microphone, filters the audio signal, and encodes the audio signal before sending it to a remote user device. The process of encoding the audio signal compresses the audio signal using a lossy compression algorithm, which may cause degradation of the audio signal. Accordingly, it can be beneficial to have a near end user device in a noisy environment transmit noise compensation information to a remote user device to which it is connected. The remote user device can then perform noise cancellation on the audio signal using the received noise compensation information before performing the encoding and sending an audio signal back to the near end user device.

Figure 2:
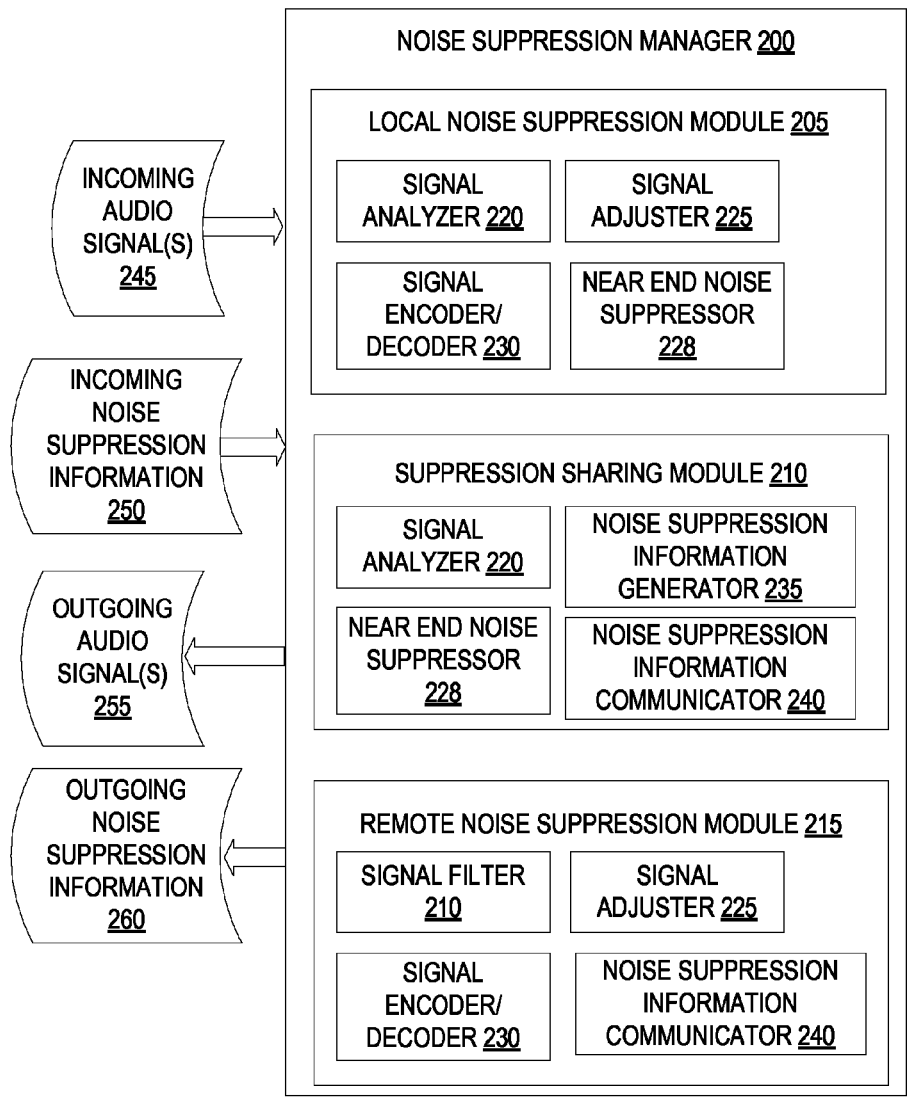
FIG. 2 is a block diagram of one embodiment of a noise suppression manager.

FIG. 2 is a block diagram of one embodiment of a noise suppression manager 200, which may correspond to the noise suppression managers 125 of FIG. 1. The noise suppression manager 200 may include one or more of a local noise suppression module 205, a suppression sharing module 210 and a remote noise suppression module 215. For example, a noise suppression manager 200 in a user device may include just a local noise suppression module 205, or a combination of a suppression sharing module 210 and a remote noise suppression module 215. However, a server system may not have local speakers or microphones, and so may include a remote noise suppression module 215, but may not include a local noise suppression module 205 or a suppression sharing module 210.

Local noise suppression module 205 is configured to adjust audio signals that will be output to speakers on a local user device running the noise suppression manager 200. In one embodiment, local noise suppression module 205 includes a signal analyzer 220, a signal adjuster 225 and a signal encoder/decoder 230. The signal analyzer 220 may analyze incoming audio signals 245 that are received from one or more microphones. The microphones may include microphones in a user device running the noise suppression manager and/or microphones in a headset that is connected to the user device via a wired or wireless (e.g. Bluetooth) connection. The analysis may identify whether the user device (and/or the headset) is in a noisy environment, as well as characteristics of such a noisy environment. In one embodiment, signal analyzer 220 determines that a user is in a noisy environment if a signal to noise ratio for a received audio signal exceeds a threshold.

In one embodiment, local noise suppression module 205 includes a near end noise suppressor 228 that performs near end noise suppression on the incoming audio signal 245. In one embodiment, the near end noise suppressor 228 is a voice processor that applies one or more noise suppression algorithms to audio signals. The near end noise suppression may improve a signal to noise ratio in audio signal so that a listener at a remote device can more clearly hear and understand the audio signal. Signal analyzer 220 may compare signal to noise ratios (SNRs) between an input signal and an output signal of the near end noise suppressor 228. If the SNR of the output signal is below the SNR of the input signal, then signal analyzer 220 may determine that a user device or headset is in a noisy environment.

Local noise suppression module 205 may receive an additional incoming audio signal 245 from a remote user device or from a server system. Typically, the received audio signal 245 will be an encoded audio signal. For example, if the audio signal is a streamed audio signal (e.g., for streamed music), the audio signal may be encoded using an a moving picture experts group (MPEG) audio layer 3 (MP3) format, and advanced audio coding (AAC) format, a waveform audio file format (WAV), an audio interchange file format (AIFF), an Apple® Lossless (m4A) format, and so on. Alternatively, if the audio signal is a speech audio signal (e.g., from a mobile phone), then the audio signal may be a speech encoded signal (e.g., an audio signal encoded using adaptive multi-rate wideband (AMR-WB) encoding, using variable-rate multimode wideband (VMR-WB) encoding, using Speex® encoding, using selectable mode vocodor (SMV) encoding, using full rate encoding, using half rate encoding, using enhanced full rate encoding, using adaptive multi-rate encoding (AMR), and so on).

Signal encoder/decoder 230 decodes the audio signal, after which signal adjuster 225 may adjust the audio signal based on the characteristics of the noisy environment. In one embodiment, signal adjuster 225 increases a volume for the audio signal. Alternatively, signal adjuster 225 increases a gain for one or more frequencies of the audio signal, or otherwise spectrally shape the audio signal. For example, signal adjuster 225 may increase the gain for signals in the 1-2 kHz frequency range, since human hearing is most attuned to this frequency range. Signal adjuster 225 may also perform a combination of increasing a volume and increasing a gain for selected frequencies. Once signal adjuster 225 has adjusted the audio signal, the user device can output the audio signal to speakers (e.g., play the audio signal), and a user may be able to hear the adjusted audio signal over the noisy environment.

Suppression sharing module 210 is configured to share noise compensation information with remote devices. The shared noise compensation information may enable those remote devices to adjust audio signals before sending them to a local user device running the noise suppression manager 200. In one embodiment, suppression sharing module 210 includes a signal analyzer 220, a noise compensation information generator 235 and a noise compensation information communicator 240. Suppression sharing module 228 may additionally include a near end noise suppressor 228.

Signal analyzer 220 analyzes an incoming audio signal received from one or more microphones, as described above. In one embodiment, signal analyzer 220 compares SNRs of input and output signals of the near end noise suppressor 228 to determine whether the user device is in a noisy environment. If signal analyzer 220 determines that the user device is in a noisy environment (e.g., output SNR is lower than input SNR by a threshold amount), signal analyzer 220 may perform a further analysis of the incoming audio signal 245 to determine characteristics of the noisy environment. In one embodiment, signal analyzer 220 compares a spectral shape of the audio signal to spectral models of standard noisy environments. For example, signal analyzer 220 may compare the spectral shape of the audio signal 245 to models for train noise, car noise, wind noise, babble noise, etc. Signal analyzer 220 may then determine a type of noisy environment that the user device is in based on a match to one or more models of noisy environments.

In one embodiment, signal analyzer 220 determines noise characteristics of the incoming audio signal. These noise characteristics may include a spectral shape of background noise present in the audio signal, prevalent frequencies in the background noise, gains associated with the prevalent frequencies, and so forth. In one embodiment, signal analyzer 220 flags those frequencies that have gains above a threshold and that are in the 1-2 kHz frequency range as being candidate frequencies for noise compensation.

Noise suppression manager 200 may receive incoming audio signals 245 from multiple microphones included in the user device and/or a headset. There may be a known or unknown separation between these microphones. Those microphones that are further from a user's face may produce audio signals that have an attenuated speech of the user. Additionally, those microphones that are closer to the user's face may be further from sources of environmental noise, and so background noises may be attenuated in audio signals generated by such microphones. In one embodiment, signal analyzer 220 compares first audio characteristics of a first audio signal generated from first audio received by a first microphone to second audio characteristics of a second audio signal generated based on second audio received by a second microphone. The comparison may distinguish between background noise and speech of a user, and may identify noise characteristics based on differences between the first audio characteristics and the second audio characteristics. Signal analyzer 220 may then determine a spectral shape of those background noises.

Noise compensation information generator 235 then generates noise compensation information based on the analysis. The noise compensation information may include an identification of a type of background noise that was detected (e.g., fan noise, car noise, wind noise, train noise, background speech, and so on). The noise compensation information may additionally identify frequencies that are prevalent in the background noise (e.g., frequencies in the 1-2 kHz frequency range), as well as the gain associated with those frequencies.

Noise compensation information communicator 240 determines whether a remote user device is capable of receiving and/or processing noise compensation information. In one embodiment, noise compensation information communicator 240 sends a query to the remote user device asking whether the remote user device supports such a capability. Noise compensation information communicator 240 may then receive a response from the remote user device that confirms or denies such a capability. If a response confirming such a capability is received, then noise compensation information communicator 240 may generate a signaling message that includes the noise compensation information, and send the signaling message to the remote user device (depicted as outgoing noise compensation information 260). The remote user device may then adjust an audio signal before sending the audio signal to the local user device. Once the local user device receives the adjusted audio signal, it may decode the audio signal, perform standard processing such as echo cancellation, filtering, and so on, and then output the audio signal to a speaker. The played audio signal may then be heard over the background noise sue to a spectral shape that is tailored to the noisy environment.

If the remote user device does not support the exchange of noise compensation information, then noise compensation information communicator 240 may generate the signaling message and send it to an intermediate device (e.g., to a server system) or wireless carrier capable of performing noise cancellation on the behalf of user devices. The server system or wireless carrier system may then intercept an audio signal from the remote user device, adjust it based on the noise compensation information, and then forward it on to the local user device.

Remote noise suppression module 215 is configured to adjust audio signals based on noise compensation information received from a remote user device before sending the audio signals to that remote user device. In one embodiment, remote noise suppression module 215 includes a signal filter 210, a signal adjuster 225, a signal encoder/decoder 230 and a noise compensation information communicator 240.

Remote noise suppression module 215 receives incoming noise compensation information 250 that is included in a signaling message. Remote noise suppression module 215 additionally receives an incoming audio signal 245. The incoming audio signal 245 may be a voice signal generated by one or more microphones of a user device or a headset attached to a user device. Alternatively, the incoming audio signal 245 may be an encoded music signal or encoded video signal that may be stored at a server system. The incoming audio signal 245 may or may not be encoded. For example, if the incoming audio signal is being received from a microphone, then the audio signal may be a raw, unprocessed audio signal. However, if the audio signal is being received from a remote user device, or if the audio signal is a music or video file being retrieved from storage, then the audio signal 245 may be encoded. If the incoming audio signal 245 is encoded, signal encoder/decoder 230 decodes the incoming audio signal 245.

If the incoming audio signal 245 is received from a microphone or microphones, signal filter 210 may filter the audio signal. Signal adjuster 225 may then adjust the audio signal based on the received noise compensation information. In an alternative embodiment, signal filter 210 may filter the incoming audio signal 245 after signal adjuster 225 has adjusted the audio signal. After the audio signal is adjusted, signal encoder/decoder 230 encodes the audio signal. Noise suppression manager 200 then transmits the adjusted audio signal (outgoing audio signal 255) to the user device from which the noise compensation information was received.

In one embodiment, noise compensation information communicator 240 exchanges capability information with a destination user device prior to receiving incoming noise information 250. Such an exchange may be performed over a control channel during setup of a connection or after a connection has been established.

Figure 3:
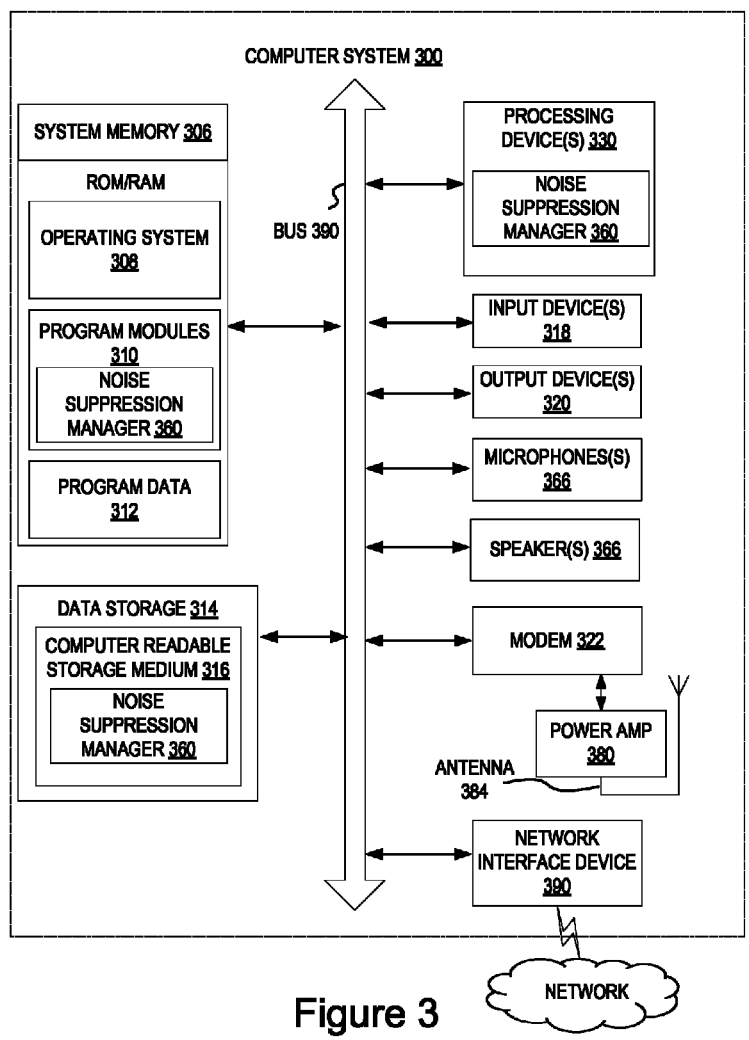
FIG. 3 is a block diagram illustrating an exemplary computer system, in accordance with one embodiment of the present invention.

FIG. 3 is a block diagram illustrating an exemplary computer system 300 configured to perform any one or more of the methodologies performed herein. In one embodiment, the computer system 300 corresponds to a user device 102-104 of FIG. 1. For example, computer system 300 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. Computer system 300 may also correspond to one or more devices of the server system 120 of FIG. 1. For example, computer system 100 may be a rackmount server, a desktop computer, a network router, switch or bridge, or any other computing device. The computer system 300 may operate in the capacity of a server or a client machine in client-server network environment, or as a peer machine in a peer-to-peer (or distributed) network environment. Further, while only a single machine is illustrated, the computer system 300 shall also be taken to include any collection of machines that individually or jointly execute a set (or multiple sets) of instructions to perform any one or more of the methodologies discussed herein.

The computer system 300 includes one or more processing devices 330, which may include general-purpose processing devices such as central processing units (CPUs), microcontrollers, microprocessors, systems on a chip (SoC), or the like. The processing devices 330 may further include field programmable gate arrays, dedicated chipsets, application specific integrated circuits (ASIC), a field programmable gate arrays (FPGA), digital signal processors (DSP), network processors, or the like. The user device 300 also includes system memory 306, which may correspond to any combination of volatile and/or non-volatile storage mechanisms. The system memory 306 stores information which may provide an operating system component 308, various program modules 310 such as noise suppression manager 360, program data 312, and/or other components. The computer system 300 may perform functions by using the processing device(s) 330 to execute instructions provided by the system memory 306. Such instructions may be provided as software or firmware. Alternatively, or additionally, the processing device(s) 330 may include hardwired instruction sets (e.g., for performing functionality of the noise suppression manager 360). The processing device 330, system memory 306 and additional components may communicate via a bus 390.

The computer system 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the noise suppression manager 360 may reside, completely or at least partially, within the computer readable storage medium 316, system memory 306 and/or within the processing device(s) 330 during execution thereof by the computer system 300, the system memory 306 and the processing device(s) 330 also constituting computer-readable media. While the computer-readable storage medium 316 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The user device 300 may also include one or more input devices 318 (keyboard, mouse device, specialized selection keys, etc.) and one or more output devices 320 (displays, printers, audio output mechanisms, etc.). In one embodiment, the computer system 300 is a user device that includes one or more microphones 366 and one or more speakers 366.

The computer system may additionally include a wireless modem 322 to allow the computer system 300 to communicate via a wireless network (e.g., such as provided by a wireless communication system) with other computing devices, such as remote user devices, a server system, and so forth. The wireless modem 322 allows the computer system 300 to handle both voice and non-voice communications (such as communications for text messages, multimedia messages, media downloads, web browsing, etc.) with a wireless communication system. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed down-link packet access (HSDPA), WiFi, long term evolution (LTE), worldwide interoperability for microwave access (WiMAX), etc.

The wireless modem 322 may generate signals and send these signals to power amplifier (amp) 380 for amplification, after which they are wirelessly transmitted via antenna 384. Antenna 384 may be configured to transmit in different frequency bands and/or using different wireless communication protocols. In addition to sending data, antenna 384 may also receive data, which is sent to wireless modem 322 and transferred to processing device(s) 330.

Computer system 300 may additionally include a network interface device 390 such as a network interface card (NIC) to connect to a network.

Figure 4:
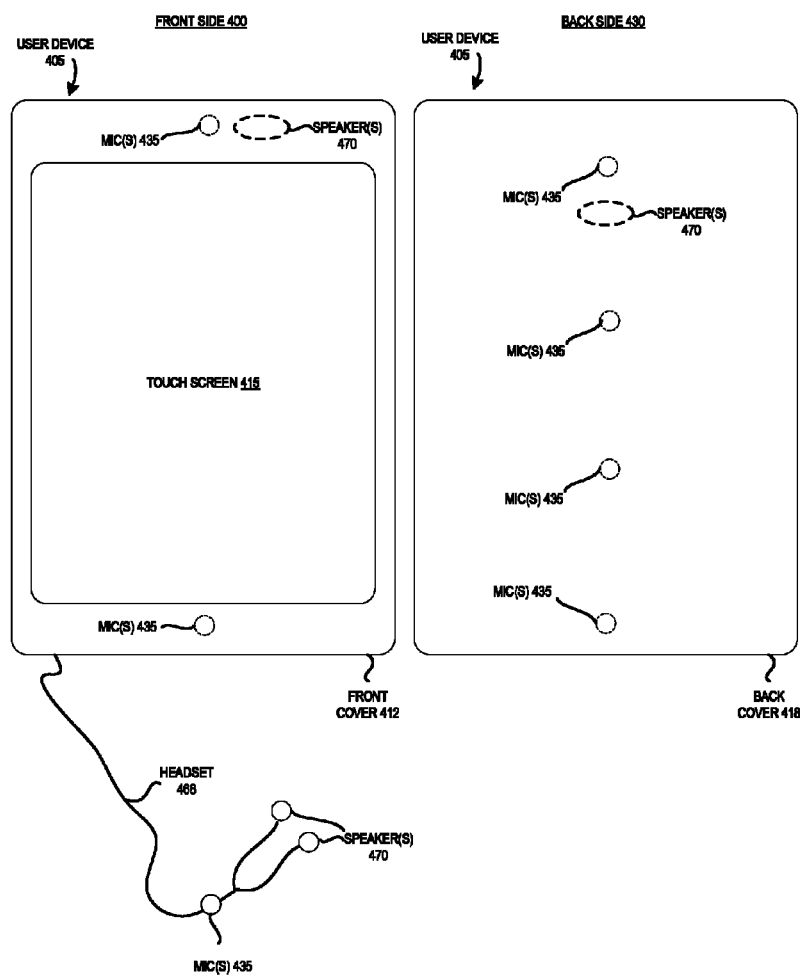
FIG. 4 illustrates an example of a front side and back side of a user device, in accordance with one embodiment of the present invention.

FIG. 4 illustrates a user device 405, in accordance with one embodiment of the present invention. A front side 400 and back side 430 of user device 405 are shown. The front side 400 includes a touch screen 415 housed in a front cover 412. The touch screen 415 may use any available display technology, such as electronic ink (e-ink), liquid crystal display (LCD), transflective LCD, light emitting diodes (LED), laser phosphor displays (LSP), and so forth. Note that instead of or in addition to a touch screen, the user device 405 may include a display and separate input (e.g., keyboard and/or cursor control device).

Disposed inside the user device 405 are one or more microphones (mics) 435 as well as one or more speakers 470. In one embodiment, multiple microphones are used to distinguish between a voice of a user of the user device 405 and background noises. Moreover, an array of microphones (e.g., a linear array) may be used to more accurately distinguish the user's voice from background noises. The microphones may be arranged in such a way to maximize such differentiation of sound sources.

In one embodiment, a headset 468 is connected to the user device 405. The headset 468 may be a wired headset (as shown) or a wireless headset. A wireless headset may be connected to the user device 405 via WiFi, Bluetooth, Zigbee®, or other wireless protocols. The headset 468 may include speakers 470 and one or more microphones 435.

In one embodiment, the headset 468 is a destination device and the user device is a source device. Thus, the headset 468 may capture an audio signal, analyze it to identify characteristics of a noisy environment, generate noise compensation information, and send the noise compensation information to the user device 405 in the manner previously described. The user device 405 may spectrally shape an additional audio signal (e.g., music being played by the user device) before sending that additional audio signal to the headset 468. In an alternative embodiment, headset 468 may transmit an unprocessed audio signal to user device 405. User device 405 may then analyze the audio signal to determine noise compensation information, spectrally shape an additional audio signal based on the noise compensation information, and send the spectrally shaped audio signal to the headset 468.

Figure 5:
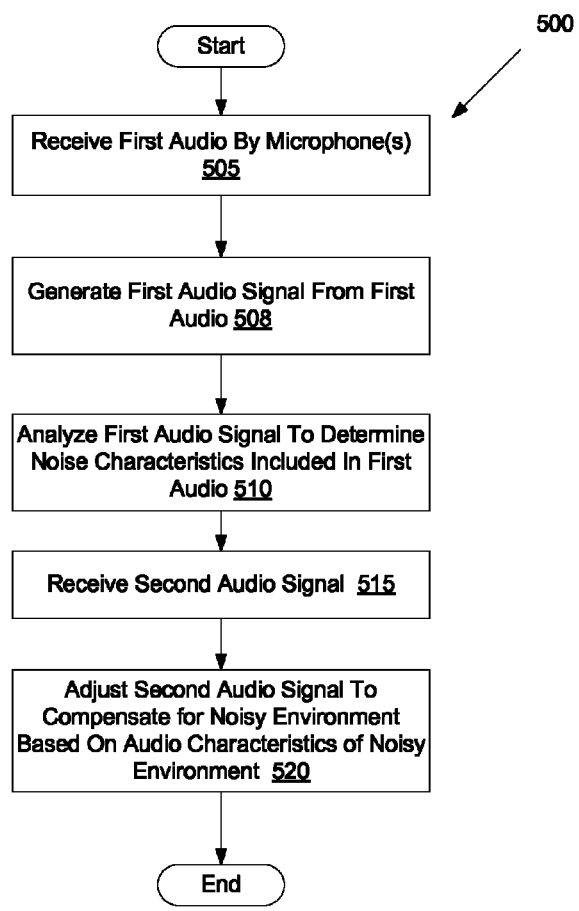
FIG. 5 is a flow diagram showing an embodiment for a method of dynamically adjusting an audio signal to compensate for a noisy environment.
Figure 6:
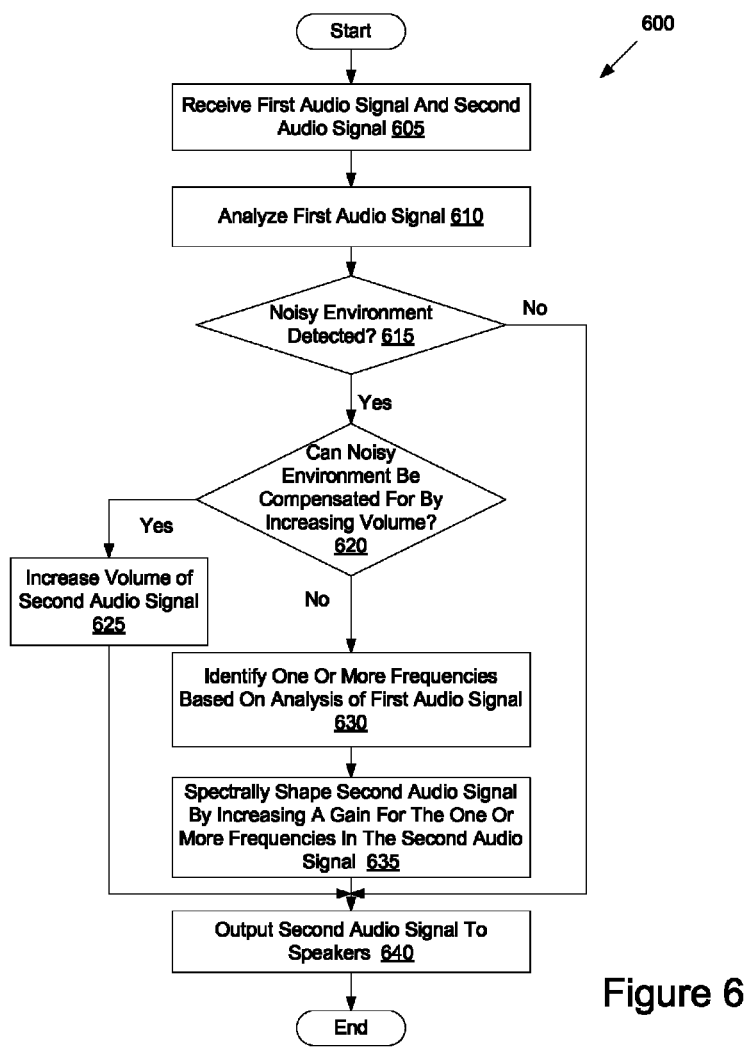
FIG. 6 is a flow diagram showing another embodiment for a method of dynamically adjusting an audio signal to compensate for a noisy environment.

FIGS. 5-6 are flow diagrams of various embodiments for methods of dynamically adjusting an audio signal to compensate for a noisy environment. The methods are performed by processing logic that may comprise hardware (circuitry, dedicated logic, etc.), software (such as is run on a general purpose computer system or a dedicated machine), or a combination of both. In one embodiment, the methods are performed by a user device 102-104 of FIG. 1. For example, the methods of FIG. 5-6 may be performed by a noise suppression manager of a user device.

FIG. 5 is a flow diagram illustrating one embodiment for a method 500 of adjusting an audio signal by a user device to compensate for background noise. At block 505 of method 500, processing logic receives first audio from a microphone (or from multiple microphones). At block 508, processing logic generates a first audio signal from the first audio. At block 510, processing logic analyzes the first audio signal to determine noise characteristics (e.g., a spectral shape, a noise type, etc. of background noise) included in the first audio signal. The noise characteristics may define the background noise (e.g., for a noisy environment) that the user device is located in.

At block 515, processing logic receives a second audio signal. In one embodiment, the second audio signal is received from a remote user device, which may be connected to the user device via a voice connection and/or a data connection. In an alternative embodiment, the second audio signal is received from a server system, which may be, for example, a cloud based media streaming server and/or a media server provided by a wireless carrier. At block 520, processing logic adjusts the second audio signal to compensate for the noisy environment based on the noise characteristics. This may include any combination of increasing a volume of the second audio signal and spectrally shaping the audio signal (e.g., performing equalization by selectively increasing the gain for one or more frequencies of the second audio signal).

FIG. 6 is a flow diagram illustrating another embodiment for a method 600 of adjusting an audio signal by a user device to compensate for a noisy environment. At block 605 of method 600, processing logic receives a first audio signal and a second audio signal. The first audio signal may be received from a microphone internal to the user device and/or a microphone of a headset connected to the user device. The second audio signal may be received from a remote device, such as a remote server or a remote user device. The second audio signal may alternatively be retrieved from local storage of the user device.

At block 610, processing logic analyzes the first audio signal to determine characteristics of background noise. At block 615, processing logic determines whether the user device (or the headset of the user device) is in a noisy environment. If the user device (or headset) is in a noisy environment, the method continues to block 620. Otherwise, the method proceeds to block 640.

At block 620, processing logic determines whether the noisy environment can be compensated for by increasing a volume of the second audio signal. If so, the method continues to block 625, and processing logic increases the volume of the second audio signal to compensate for the noisy environment. Processing logic may determine an amount to increase the volume based on a level of background noise. If at block 620 processing logic determines that the noisy environment cannot be effectively compensated for by increasing volume (e.g., if the volume is already maxed out), processing logic continues to block 630.

At block 630, processing logic identifies one or more frequencies based on the analysis of the first audio signal. The identified frequencies may be those frequencies that are prevalent in the noisy environment and that are audible to the human ear. For example, one or more frequencies in the 1-2 kHz frequency range may be identified. At block 635, processing logic spectrally shapes the second audio signal by increasing a gain for the one or more identified frequencies in the second audio signal. Processing logic may quantize individual frequencies for analysis and/or for adjustment based on performing fast Fourier transforms (FFTs) on the first and/or second audio signals. Alternatively, processing logic may quantize the individual frequencies using polyphase filters.

At block 640, processing logic outputs the adjusted second audio signal to speakers (e.g., plays the audio signal). The method may repeat continuously so long as additional audio signals are received (e.g., during a phone call or during music streaming).

Figure 7:
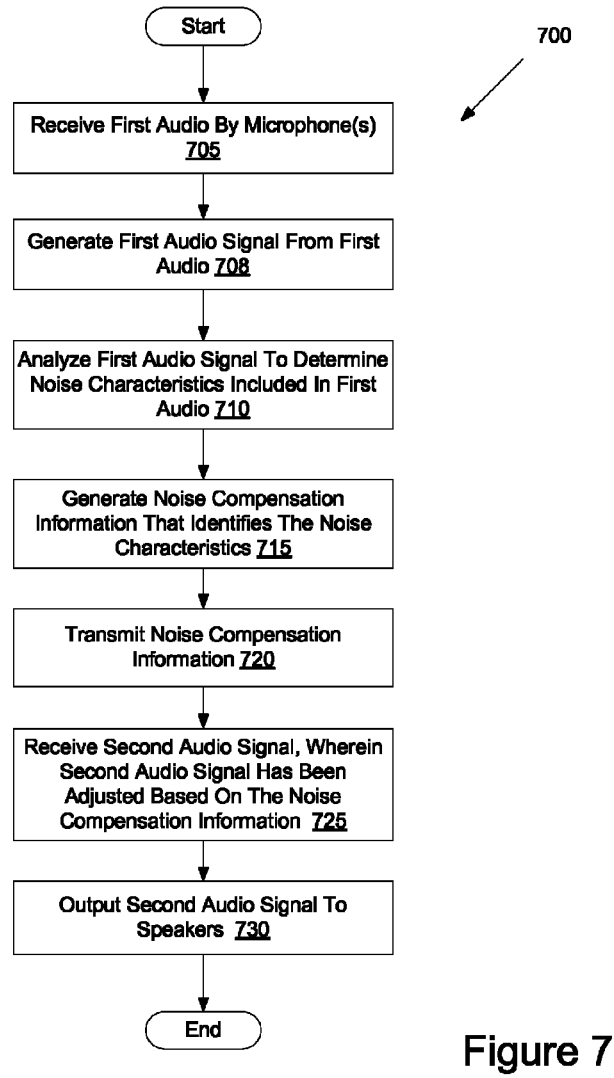
FIG. 7 is a flow diagram showing an embodiment for a method of transmitting noise compensation information.
Figure 8A:
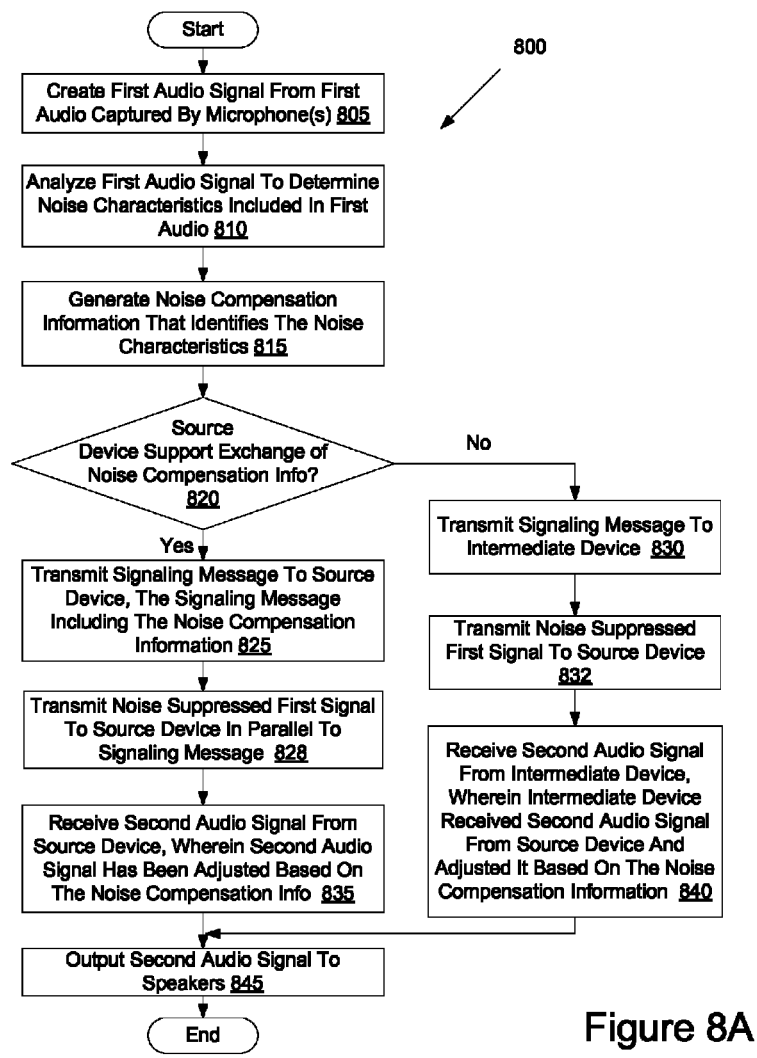
FIG. 8A is a flow diagram showing another embodiment for a method of transmitting noise compensation information.

FIGS. 7-8A are flow diagrams of various embodiments for methods of transmitting or sharing noise compensation information. The methods are performed by processing logic that may comprise hardware (circuitry, dedicated logic, etc.), software (such as is run on a general purpose computer system or a dedicated machine), or a combination of both. In one embodiment, the methods are performed by a user device 102-104 of FIG. 1. For example, the methods of FIG. 7-8 may be performed by a noise suppression manager of a user device. The user device may be a destination device that is connected to a remote source device via a wireless connection.

FIG. 7 is a flow diagram illustrating one embodiment for a method 700 of transmitting noise compensation information. At block 705 of method 700, processing logic activates a microphone (or multiple microphones) and receives first audio from the microphone (or microphones). At block 708, processing logic generates a first audio signal from the first audio. At block 710, processing logic analyzes the first audio signal to determine noise characteristics included in the first audio. These noise characteristics may define a noisy environment of the user device. At block 715, processing logic generates noise compensation information that identifies the noise characteristics.

At block 720, processing logic transmits the noise compensation information. The noise compensation information may be transmitted to the source device via a control channel. Processing logic may additionally send the first audio signal to the source device in parallel to the noise compensation information (e.g., via a data channel).

At block 725, processing logic receives a second audio signal that has been adjusted based on the noise compensation information. At block 730, processing logic outputs the second audio signal to speakers.

FIG. 8A is a flow diagram illustrating another embodiment for a method 800 of transmitting noise compensation information by a destination device. At block 805 of method 800, processing logic creates a first audio signal from first audio captured by a microphone (or microphones). At block 810, processing logic analyzes the first audio signal to determine noise characteristics included in the first audio. At block 815, processing logic generates noise compensation information that identifies the noise characteristics.

At block 820, processing logic determines whether a source device coupled to the destination device supports receipt (or exchange) of noise compensation information. Such a determination may be made by sending a query to the source device asking whether the source device supports the receipt of noise compensation information. In one embodiment, the query is sent over a control channel. In response to the query, processing logic may receive a confirmation message indicating that the source device does support the exchange of noise compensation information. Alternatively, processing logic may receive an error response or a response stating that the source device does not support the receipt of noise compensation information. The query and response may be sent during setup of a voice connection between the source device and the destination device (e.g., while negotiating setup of a telephone call). The query and response may also be exchanged at any time during an active voice connection. If the source device supports the exchange of noise compensation information, the method continues to block 825. Otherwise, the method proceeds to block 830.

At block 825, processing logic transmits a signaling message including the noise compensation information to the source device. At block 828, processing logic additionally transmits the first audio signal to the source device in parallel to the signaling message. The first audio signal may have been noise suppressed by processing logic, and so the source device may not be able to determine that the destination device is in a noisy environment based on the first audio signal. However, the signaling message, which may be sent in parallel to the first audio signal on a control channel, provides such information.

At block 835, processing logic receives a second audio signal from the source device. The second audio signal will have been adjusted by the source device based on the noise compensation information that was sent to the source device in the signaling message.

At block 830, processing logic transmits the signaling message to an intermediate device. The intermediate device may be, for example, a server system configured to alter audio signals exchanged between user devices. At block 832, processing logic transmits the first audio signal to the source device, the first audio signal having been noise suppressed before transmission. At block 840, processing logic receives a second audio signal from the intermediate device. The second audio signal will have been produced by the source device and intercepted by the intermediate device. The intermediate device will have then adjusted the second audio signal based on the noise compensation information and then transmitted the second audio signal to the destination device.

At block 845, processing logic outputs the second audio signal to speakers. Method 800 may repeat while a voice connection is maintained between the source device and the destination device. For example, noise compensation information may be sent to the source device periodically or continuously while the voice connection is active.

In one embodiment, processing logic applies one or more criteria for generating new noise compensation information. The criteria may include time based criteria (e.g., send new noise compensation information every 10 seconds) and/or event based criteria. One example of an event based criterion is a mode change criterion (e.g., generate new noise compensation if switching between a headset mode, a speakerphone mode and a handset mode). Another example of an event based criterion is a noise change threshold. Processing logic may continually or periodically analyze audio signals generated based on audio captured by the user device's microphones to determine updated noise characteristics. Processing logic may then compare those updated noise characteristics to noise characteristics represented in noise compensation information previously transmitted to a remote device. If there is more than a threshold difference between the updated noise characteristics and the previous noise characteristics, processing logic may generate new noise compensation information.

Additionally, the roles of the source device and the destination device may switch. Therefore, each device may receive noise compensation information in a control channel along with an audio signal containing voice data. Each device may then use the received noise compensation information to spectrally shape an audio signal before sending it to the remote device to which it is connected.

Note that methods 500-800 may be initiated while microphones of the user device are deactivated. For example, the user device may be connected to multiple other user devices via a bridge connection (e.g., in a conference call), and the user device may have a mute function activated. In such an instance, processing logic may briefly activate the microphones, collect the first audio to produce the first audio signal, and then deactivate the microphones once the first audio signal is generated. In one embodiment, processing logic uses sensor data generated by sensors of the user device to determine whether to activate the microphones. For example, the user device may use an image sensor to generate an image, and processing logic may then analyze the image to determine an environment that the user device is in. If processing logic determines that the user device is in a noisy environment (e.g., it detects automobiles, a crowd, a train, etc.), then processing logic may activate the microphones. Note that processing logic may additionally keep the microphones activated, but may turn on a smart mute function, in which audio signals generated from the microphones are not sent to other devices.

Figure 8B:
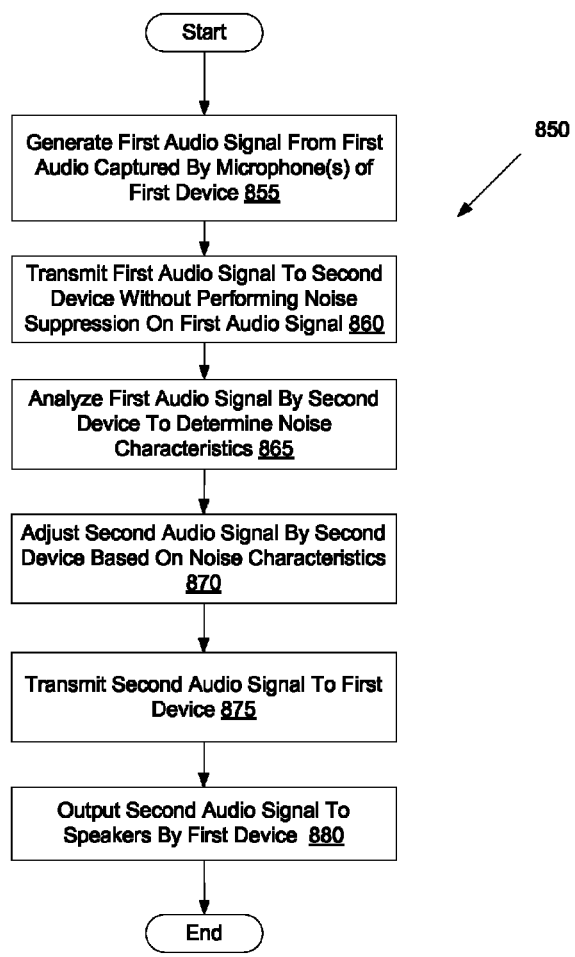
FIG. 8B is a flow diagram showing an embodiment for a method of performing noise compensation.

FIG. 8B is a flow diagram of an embodiment for a method 850 of performing noise compensation. Method 850 is performed by processing logic that may comprise hardware (circuitry, dedicated logic, etc.), software (such as is run on a general purpose computer system or a dedicated machine), or a combination of both. In one embodiment, the method 850 is performed by two user devices that are connected via a wireless voice connection.

At block 855 of method 850, a first device obtains a first audio from one or more microphones and generates a first audio signal from the first audio. At block 860, the first device transmits the first audio signal to a second device without performing noise suppression on the first audio signal. Accordingly, the first audio signal may include noise characteristics of a noisy background of the first device.

At block 865, the second device analyzes the first audio signal to determine noise characteristics of the first audio. At block 870, the second device adjusts a second audio signal based on the noise characteristics. At block 875, the second device sends the adjusted second audio signal to the first device. At block 880, the first device may then output the adjusted second audio signal to a speaker. Since the second audio signal was adjusted based on the noise characteristics, a user of the first device may be able to better hear and understand second audio produced based on the second audio signal over a noisy environment.

Figure 9:
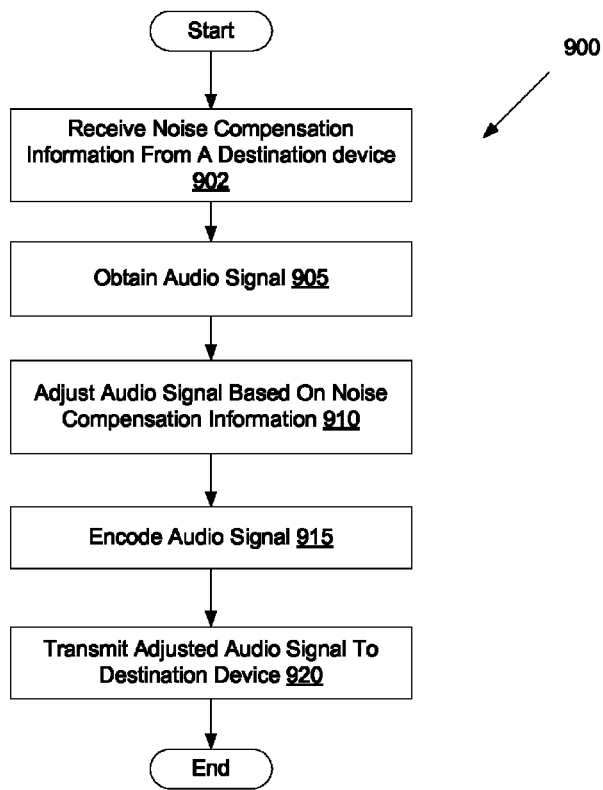
FIG. 9 is a flow diagram showing an embodiment for a method of adjusting an audio signal based on received noise compensation information.
Figure 10:
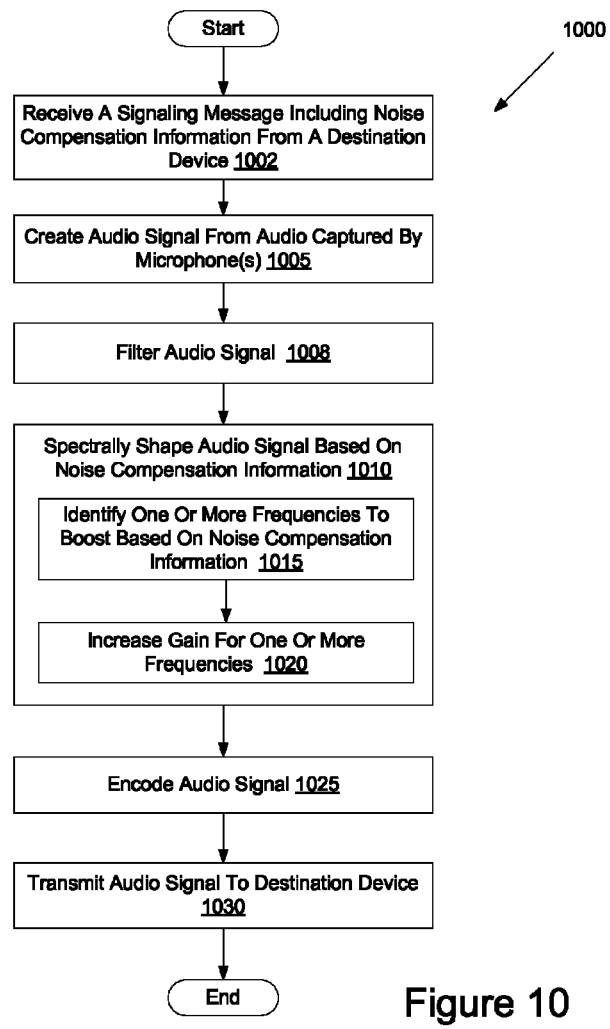
FIG. 10 is a flow diagram showing another embodiment for a method of adjusting an audio signal based on received noise compensation information.
Figure 11:
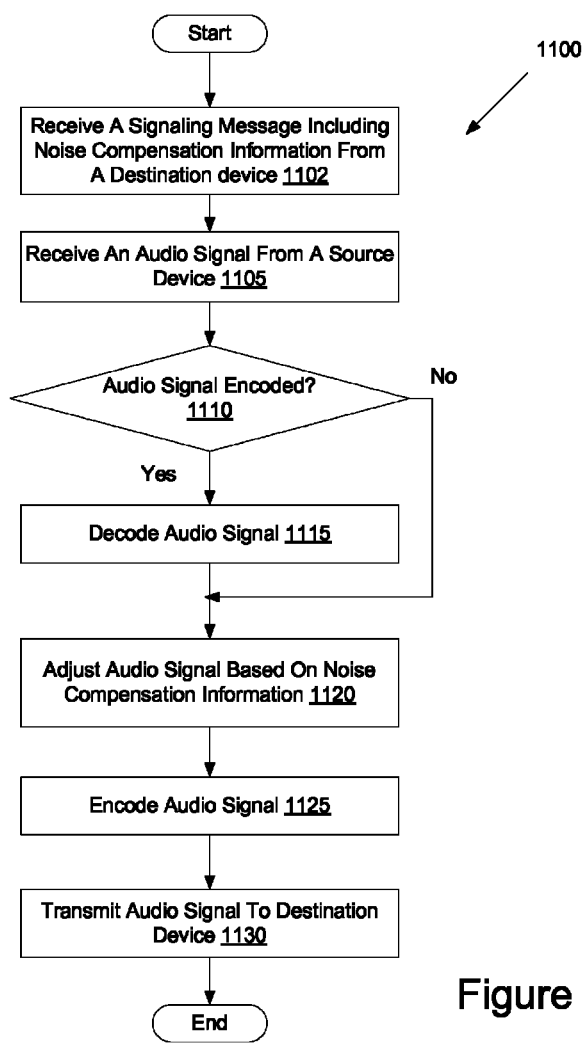
FIG. 11 is a flow diagram showing yet another embodiment for a method of adjusting an audio signal based on received noise compensation information.

FIGS. 9-11 are flow diagrams of various embodiments for methods of adjusting an audio signal based on received noise compensation information. The methods are performed by processing logic that may comprise hardware (circuitry, dedicated logic, etc.), software (such as is run on a general purpose computer system or a dedicated machine), or a combination of both. In one embodiment, the methods are performed by a user device 102-104 of FIG. 1. For example, the methods of FIG. 9-11 may be performed by a noise suppression manager of a user device. The methods may also be performed by a server system or wireless communication system, such as server system 120 or wireless communication system 110 of FIG. 1.

FIG. 9 is a flow diagram illustrating one embodiment for a method 900 of adjusting an audio signal based on noise compensation information received by a source device from a destination device. At block 902 of method 900, processing logic receives noise compensation information from a destination device. At block 905, processing logic obtains an audio signal. In one embodiment, processing logic receives the audio signal from a microphone connected to the processing logic. In an alternative embodiment, processing logic retrieves the audio signal from storage.

At block 910, processing logic adjusts the audio signal based on the noise compensation information. This may include spectrally shaping the audio signal, such as increasing the gain of one or more frequencies of the audio signal.

At block 915, processing logic encodes the audio signal. At block 920, processing logic transmits the audio signal to the destination device. The destination device may then play the audio signal, and a user of the destination device may be able to hear the audio signal over a noisy environment.

FIG. 10 is a flow diagram illustrating another embodiment for a method 1000 of adjusting an audio signal based noise compensation information received by a source device from a destination device. At block 1002 of method 1000, processing logic receives a signaling message including noise compensation information from a destination device. At block 1005, processing logic captures audio using one or more microphones and generates an audio signal. The microphones may be housed within the source device or may be components of a headset that is attached to the source device via a wired or wireless connection. The generated audio signal may be a raw, unprocessed audio signal (e.g., a raw pulse code modulated (PCM) signal).

At block 1008, processing logic performs near end suppression on the audio signal and/or filters the audio signal. At block 1010, processing logic spectrally shapes the audio signal based on the received noise compensation information. In one embodiment, at block 1015 processing logic identifies one or more frequencies (but potentially fewer than all frequencies) to boost based on the noise compensation information. At block 1020, processing logic then increases a gain for the one or more identified frequencies. Note that in alternative embodiments, the operations of block 1008 may be performed after the operations of block 1010.

At block 1025, processing logic encodes the spectrally shaped audio signal. At block 1030, processing logic then transmits the audio signal to the destination device.

FIG. 11 is a flow diagram illustrating another embodiment for a method 1100 of adjusting an audio signal based on noise compensation information received by a source device from a destination device. At block 1102 of method 1100, processing logic receives a signaling message including noise compensation information from a destination device. At block 1105, processing logic receives an audio signal from a source device. In one embodiment, the received audio signal is an encoded signal. The process of encoding an audio signal compresses the audio signal, causing it to consume far less bandwidth when transmitted. For example, a raw PCM signal is an 8 kHz signal with an 8 bit or 16 bit sample rate, and thus consumes roughly 256 kHz per second of bandwidth. In contrast, a speech encoded signal has a bandwidth consumption of approximately 12 kHz per second. However, the process of encoding the audio signal causes come degradation of the audio signal. This can reduce an effectiveness of spectral shaping to compensate for noisy environments. Accordingly, the received audio signal may also be received as an unencoded audio signal.

At block 1110, processing logic determines whether the audio signal has been encoded. If the audio signal is an encoded signal, the method continues to block 1115, and processing logic decodes the audio signal. Otherwise, the method proceeds to block 1120.

At block 1120, processing logic adjusts the audio signal based on the noise compensation information. At block 1125, processing logic encodes the audio signal. At block 1130, processing logic then transmits the audio signal to the destination device. Thus, a server may sit between two user devices and intercept audio signals and noise compensation information from each. The server may adjust the audio signals based on the noise compensation information to improve the audio quality and reduce signal to noise ratios for each of the user devices based on background noise characteristics specific to those user devices.

Figure 12:
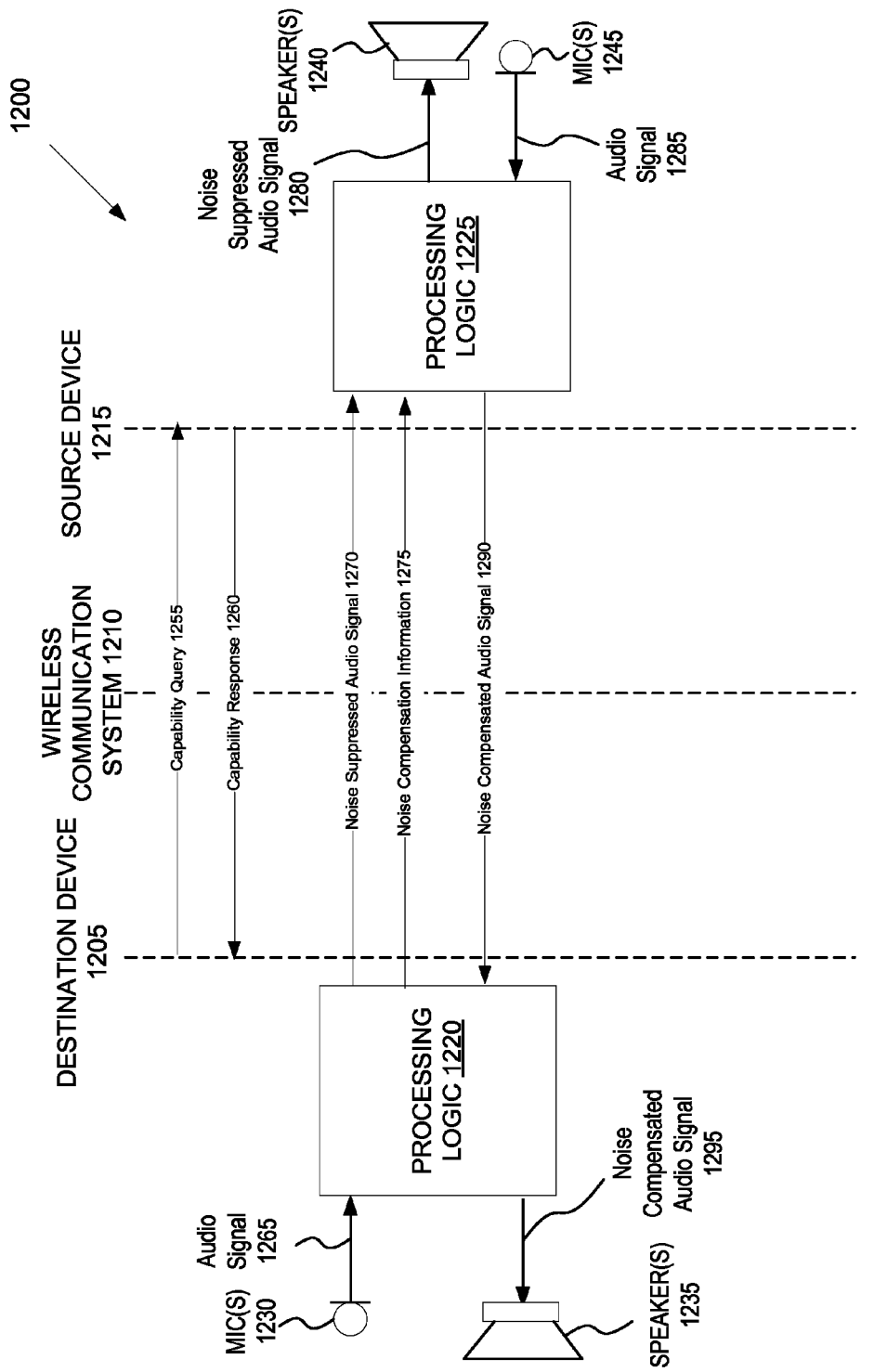
FIG. 12 illustrates an example exchange of audio signals and noise compensation information between a source device and a destination device, in accordance with one embodiment of the present invention.

FIG. 12 is a diagram showing message exchange between two user devices that support exchange of noise compensation information, in accordance with one embodiment of the present invention. The two user devices include a destination device 1205 that is in a noisy environment and a source device 1215. These devices may establish a wireless voice connection via a wireless communication system 1210. The wireless voice connection may be a connection using WiFi, GSM, CDMA, WCDMA, TDMA, UMTS, LTE or some other type of wireless communication protocol. Either during the establishment of the wireless voice connection or sometime thereafter, the destination device and the source device exchange capability information to determine whether they are both capable of exchanging noise compensation information. In one embodiment, the destination device 1205 sends a capability query 1255 to the source device 1215, and the source device 1215 replies with a capability response 1260. Provided that both the destination device 1205 and the source device 1215 support the exchange of noise compensation information, then a noise compensation information exchange may be enabled.

Destination device may include microphones (mics) 1230, speakers 1235 and processing logic 1220. The processing logic 1220 may be implemented as modules programmed for a general processing device (e.g., a SoC that includes a DSP) or as dedicated chipsets. The microphones 1230 send an audio signal (or multiple audio signals) 1265 to the processing logic 1220. The processing logic 1220 extracts noise compensation information from the audio signal 1265 based on an analysis of the audio signal 1265. Processing logic 1220 then performs noise suppression on the audio signal 1265 to remove background noise and/or filter the audio signal. That way, a listener at the destination device will not hear any of the background noise. The processing logic 1220 then transmits the noise suppressed audio signal 1270 in a first band and the noise compensation information 1275 in a second band to the source device 1215. The noise suppressed audio signal 1270 may be sent in a data channel and the noise compensation information 1275 may be sent in a control channel.

The source device may also include speakers 1240, microphones 1245 and processing logic 1225. The processing logic 1225 may decode the noise suppressed audio signal 1270 and output it to the speakers 1240 so that a listener at the source device 1215 may hear the audio signal generated by the destination device 1205. Additionally, the processing logic 1225 may receive an audio signal 1285 from microphones 1245. Processing logic 1225 may then filter the audio signal 1285 and/or perform near end noise suppression on the audio signal 1285 (e.g., to remove background noise from the signal). Processing logic 1225 may additionally adjust the audio signal 1285 based on the received noise compensation information. Once the audio signal has been adjusted, processing logic 1225 may encode the audio signal, and send the encoded audio signal to destination device 1205. Processing logic 1220 may then decode the noise compensated audio signal 1290 and output it 1295 to the speakers 1235. A listener at the destination device 1205 should be able to hear the audio signal 1295 over the background noise at the location of the destination device 1205.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "transmitting", "receiving", "analyzing", "adjusting", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a user device, such as user devices 102-104 of FIG. 1. In other embodiments, the methods are performed by server devices, such as server system 120 of FIG. 1.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
 receiving a first audio by one or more microphones of a first device;
 generating, by the first device, a first audio signal from the received first audio;
 analyzing the first audio signal to determine noise associated with the first audio received by the first device;
 generating noise compensation information based at least in part on the noise associated with the first audio;
 transmitting, by the first device, the noise compensation information to at least one of a second device or a third device that is intermediate to the first device and the second device;
 receiving a second audio signal generated by the second device, the second audio signal based at least in part on the noise compensation information transmitted by the first device; and
 outputting the received second audio signal to a speaker of the first device.

2. The method of claim 1, wherein the noise compensation information includes information about frequencies of the second audio signal to be altered.

3. The method of claim 1, further comprising:
 determining whether the second device supports a capability to receive the noise compensation information; and
 transmitting the noise compensation information to the second device in response to determining that the second device supports the capability to receive the noise compensation information.

4. The method of claim 3, wherein determining whether the second device supports the capability to receive the noise compensation information comprises:
 transmitting a query to the second device or the third device as to whether the second device supports the capability to receive the noise compensation information; and
 receiving a response from the second device or the third device confirming the capability.

5. The method of claim 1, further comprising:
 determining that the second device does not support receiving the noise compensation information; and
 in response to the determining, transmitting the noise compensation information to the third device.

6. The method of claim 5, further comprising:
 receiving a version of the second audio signal from the third device, the version of the second audio signal being based at least in part on the noise compensation information transmitted by the first device.

7. The method of claim 1, wherein the one or more microphones comprise a first microphone and a second microphone, the method further comprising:
 determining the noise based on differences in audio signals generated by the first microphone and the second microphone.

8. The method of claim 1, further comprising:
 determining whether a criterion for sending additional noise compensation information has been satisfied; and
 in response to determining that the criterion has been satisfied:
  generating the additional noise compensation information; and
  transmitting the additional noise compensation information to the second device or the third device.

9. The method of claim 1, further comprising:
processing the first audio signal based at least in part on the noise compensation information; and
transmitting the processed first audio signal to the second device.

10. A first device comprising:
a transmitter configured to transmit noise compensation information associated with the first device, wherein the noise compensation information is based at least in part on noise associated with a first audio captured by the first device using one or more microphones;
a receiver configured to receive an audio signal generated by a second device, the audio signal being based at least in part on the transmitted noise compensation information; and
a speaker configured to output the received audio signal.

11. The first device of claim 10, wherein the noise compensation information is transmitted to the second device in conjunction with a first audio signal, the first audio signal generated from the first audio captured by the first device.

12. The first device of claim 10, wherein the transmitter is further configured to:
transmit a query to the second device or a third device intermediate to the first device and the second device, the query asking whether the second device supports a capability to receive the noise compensation information; and
transmit the noise compensation information to the second device in response to confirming the capability.

13. The first device of claim 10, wherein the first device further comprises:
a processing device configured to generate a first audio signal from the captured first audio, to analyze the first audio signal to determine the noise associated with the first audio, and to generate the noise compensation information based at least in part on the determined noise.

14. The first device of claim 13, wherein the one or more microphones comprise a first microphone and a second microphone, and wherein the processing device is further configured to:
determine the noise based on differences between audio signals generated by the first microphone and the second microphone.

15. The first device of claim 13, wherein the processing device is further configured to process the first audio signal based at least in part on the noise compensation information, and the transmitter is further configured to transmit the processed first audio signal to the second device.

16. The first device of claim 10, wherein the transmitter is configured to transmit the noise compensation information to a third device that is intermediate between the first device and the second device in response to a determination that the second device does not support receipt of the noise compensation information.

17. The first device of claim 16, wherein the receiver is configured to receive a version of the audio signal from the third device, the version of the audio signal being based at least in part on the noise compensation information transmitted by the first device.

18. A first device comprising:
a receiver to receive noise compensation information from a second device, the noise compensation information based at least in part on noise associated with audio captured by the second device; and
a transmitter to transmit a first audio signal generated by the first device to the second device, the first audio signal based at least in part on the noise compensation information received from the second device.

19. The first device of claim 18, further comprising:
one or more microphones configured to capture a first audio that is used to generate the first audio signal.

20. The first device of claim 18, further comprising:
a processing device to process the first audio signal based at least in part on the noise compensation information.

21. The first device of claim 20, wherein processing the first audio signal further includes:
increasing a gain for one or more frequencies of the first audio signal, the one or more frequencies identified based on the noise compensation information.

22. The first device of claim 18, wherein the first device and the second device are mobile devices.

23. The first device of claim 18, wherein the first device is a user device and the second device is a headset in communication with the first device.

24. A non-transitory computer readable storage medium having instructions that, when executed by a first device, cause the first device to perform a method comprising:
receiving, by the first device, noise compensation information from a second device, the noise compensation information based at least in part on noise associated with audio captured by the second device;
processing, by the first device, a first audio signal based at least in part on the noise compensation information, the first audio signal generated from audio captured by the first device; and
transmitting the processed first audio signal to the second device.

25. The non-transitory computer readable storage medium of claim 24, wherein processing the second audio signal comprises increasing a gain for one or more frequencies of the first audio signal, the one or more frequencies identified based on the noise compensation information.

* * * * *